US011646617B2

(12) United States Patent
Shiao et al.

(10) Patent No.: US 11,646,617 B2
(45) Date of Patent: May 9, 2023

(54) HIGH-FREQUENCY ROTATING STRUCTURE WITH PERMANENT MAGNET ROTOR HAVING GROOVES AND MAGNETIC BARRIER SPACES

(71) Applicant: HIWIN MIKROSYSTEM CORP., Taichung (TW)

(72) Inventors: Ruei-Bin Shiao, Taichung (TW); Cheng-Te Chi, Taichung (TW); Zhe-Wei Cheng, Taichung (TW); Ming-Chang Hsu, Taichung (TW)

(73) Assignee: HIWIN MIKROSYSTEM CORP., Taichung (TW)

( * ) Notice: Subject to any disclaimer, the term of this patent is extended or adjusted under 35 U.S.C. 154(b) by 11 days.

(21) Appl. No.: 17/461,739

(22) Filed: Aug. 30, 2021

(65) Prior Publication Data
US 2023/0070317 A1    Mar. 9, 2023

(51) Int. Cl.
*H02K 1/278* (2022.01)
*H02K 1/276* (2022.01)

(52) U.S. Cl.
CPC .......... *H02K 1/278* (2013.01); *H02K 1/276* (2013.01); *H02K 2213/03* (2013.01)

(58) Field of Classification Search
CPC ........ H02K 1/27; H02K 1/276; H02K 1/2766; H02K 1/278; H02K 9/03; H02K 15/024; H02K 2213/03
USPC ............ 310/156.53, 156.56, 156.57, 156.08
See application file for complete search history.

(56) References Cited

U.S. PATENT DOCUMENTS

| | | | | |
|---|---|---|---|---|
| 5,508,576 A | * | 4/1996 | Nagate | H02K 11/0141 310/64 |
| 6,034,459 A | * | 3/2000 | Matsunobu | B60L 15/20 310/156.53 |
| 6,047,460 A | * | 4/2000 | Nagate | H02K 15/03 29/598 |
| 6,087,752 A | * | 7/2000 | Kim | H02K 1/2766 310/156.56 |
| 6,133,662 A | * | 10/2000 | Matsunobu | H02K 1/278 310/156.53 |

(Continued)

FOREIGN PATENT DOCUMENTS

JP    WO2020110191 A1    6/2020

*Primary Examiner* — Maged M Almawri
(74) *Attorney, Agent, or Firm* — Guice Patents PLLC

(57) ABSTRACT

A high-frequency rotating structure provided by the invention has an annular rotating element with a quincuncial outer periphery, a plurality of radially arranged accommodating grooves respectively disposed in an annular body of the rotating element, a plurality of hole-shaped magnetic barrier spaces respectively disposed in the annular body, and respectively communicated with one of two ends of each of the accommodating grooves, and a plurality of magnetic assemblies respectively embedded in each of the accommodating grooves. A shortest first distance A between a groove wall of each of the two ends of each of the accommodating grooves and an outer annular surface of the body, and a shortest second distance B between a hole wall of each of the magnetic barrier spaces and the outer annular surface of the body are defined by the following formula 1:

$$\alpha = \frac{A}{B} \times 100\%, \ 122\% \geq \alpha \geq 90\%. \quad \text{formula 1}$$

10 Claims, 5 Drawing Sheets

(56) References Cited

U.S. PATENT DOCUMENTS

| | | | | |
|---|---|---|---|---|
| 6,353,275 B1* | 3/2002 | Nishiyama | H02K 1/276 | 310/156.53 |
| 6,486,581 B2* | 11/2002 | Miyashita | H02K 21/14 | 310/156.01 |
| 6,525,442 B2* | 2/2003 | Koharagi | H02K 1/2766 | 310/156.56 |
| 6,597,079 B2* | 7/2003 | Miyashita | H02K 1/276 | 310/156.48 |
| 6,867,526 B2* | 3/2005 | Mori | H02K 1/2766 | 310/156.57 |
| 6,917,133 B2* | 7/2005 | Koharagi | H02K 21/16 | 310/156.56 |
| 7,119,507 B2* | 10/2006 | Nishijima | H02K 1/276 | 318/632 |
| 7,151,335 B2* | 12/2006 | Tajima | B60L 50/66 | 310/156.56 |
| 7,230,359 B2* | 6/2007 | Iles-Klumpner | H02K 1/276 | 310/156.56 |
| 7,327,062 B2* | 2/2008 | Kaneko | H02K 1/276 | 310/156.53 |
| 7,605,510 B2* | 10/2009 | Okuma | H02K 1/2766 | 310/156.56 |
| 7,612,480 B2* | 11/2009 | Fujii | H02K 1/2766 | 310/156.56 |
| 7,652,405 B2* | 1/2010 | Adaniya | H02K 1/276 | 310/156.56 |
| 7,808,143 B2* | 10/2010 | Lee | H02K 1/2766 | 310/156.56 |
| 7,843,101 B2* | 11/2010 | Ito | H02K 1/28 | 417/423.1 |
| 7,906,882 B2* | 3/2011 | Okuma | H02K 1/276 | 310/156.56 |
| 8,179,011 B2* | 5/2012 | Takemoto | H02K 21/16 | 310/156.53 |
| 8,193,672 B2* | 6/2012 | Oh | H02K 1/276 | 310/216.106 |
| 8,368,273 B2* | 2/2013 | Hino | B60L 50/61 | 310/156.47 |
| 8,405,270 B2* | 3/2013 | Li | H02K 1/276 | 310/156.53 |
| 8,643,239 B2* | 2/2014 | Takemoto | H02K 1/276 | 310/156.45 |
| 8,659,200 B2* | 2/2014 | Adaniya | H02K 21/16 | 310/156.57 |
| 9,077,224 B2* | 7/2015 | Morishita | H02K 1/2766 | |
| 9,236,775 B2* | 1/2016 | Takahashi | H02K 21/14 | |
| 9,893,580 B2* | 2/2018 | Soma | H02K 1/276 | |
| 9,985,484 B2* | 5/2018 | Liang | H02K 1/276 | |
| 10,958,120 B2* | 3/2021 | Tang | H02K 1/2766 | |
| 2001/0028201 A1* | 10/2001 | Miyashita | H02K 21/16 | 310/254.1 |
| 2002/0047432 A1* | 4/2002 | Miyashita | H02K 21/14 | 310/156.48 |
| 2002/0047434 A1* | 4/2002 | Koharagi | H02K 21/16 | 310/156.56 |
| 2002/0171309 A1* | 11/2002 | Wakui | H02K 1/2766 | 310/156.48 |
| 2003/0178905 A1* | 9/2003 | Koharagi | H02K 1/2766 | 310/156.38 |
| 2003/0222526 A1* | 12/2003 | Matsunobu | H02K 29/03 | 310/156.56 |
| 2004/0017123 A1* | 1/2004 | Miyashita | H02K 1/276 | 310/156.53 |
| 2005/0168089 A1* | 8/2005 | Miyashita | H02K 29/03 | 310/156.57 |
| 2005/0200223 A1* | 9/2005 | Tajima | H02K 1/2766 | 310/156.55 |
| 2006/0131976 A1* | 6/2006 | Kikuchi | H02K 1/276 | 310/156.46 |
| 2007/0085436 A1* | 4/2007 | Tajima | B60L 50/66 | 310/156.53 |
| 2007/0126305 A1* | 6/2007 | Okuma | H02K 1/2766 | 310/156.53 |
| 2007/0145851 A1 | 6/2007 | Kikuchi et al. | | |
| 2007/0200447 A1* | 8/2007 | Adaniya | H02K 29/03 | 310/156.53 |
| 2008/0203842 A1* | 8/2008 | Yoshikawa | H02K 1/276 | 310/156.01 |
| 2009/0230802 A1* | 9/2009 | Kamiya | B60L 15/2009 | 903/906 |
| 2010/0176682 A1* | 7/2010 | Kori | H02K 1/276 | 310/156.53 |
| 2010/0194228 A1* | 8/2010 | Lee | H02K 29/03 | 310/156.53 |
| 2010/0213780 A1* | 8/2010 | Lee | H02K 1/2766 | 310/156.53 |
| 2011/0062814 A1* | 3/2011 | Adaniya | H02K 29/03 | 310/156.53 |
| 2011/0133590 A1* | 6/2011 | Lokhandwalla | H02K 1/2766 | 310/156.53 |
| 2012/0019089 A1* | 1/2012 | Takemoto | H02K 1/276 | 310/156.54 |
| 2012/0139378 A1* | 6/2012 | Endo | H02K 15/03 | 29/598 |
| 2012/0139381 A1* | 6/2012 | Kingrey | H02K 1/276 | 310/156.53 |
| 2012/0139386 A1* | 6/2012 | Murakami | H02K 1/146 | 310/216.092 |
| 2012/0242182 A1* | 9/2012 | Yabe | H02K 1/276 | 310/156.53 |
| 2012/0293033 A1* | 11/2012 | Hisada | H02K 1/2766 | 310/156.01 |
| 2013/0207500 A1* | 8/2013 | Bi | H02K 1/27 | 310/156.01 |
| 2013/0270958 A1* | 10/2013 | Takahashi | H02K 1/274 | 310/156.38 |
| 2014/0217849 A1* | 8/2014 | Soma | H02K 1/2766 | 310/156.53 |
| 2014/0361646 A1* | 12/2014 | Saito | B60L 15/007 | 310/51 |
| 2015/0061447 A1* | 3/2015 | Mae | H02K 29/03 | 310/156.53 |
| 2015/0069874 A1* | 3/2015 | Iki | H02K 1/274 | 310/156.11 |
| 2015/0091407 A1* | 4/2015 | Kayano | H02K 1/2766 | 310/156.38 |
| 2015/0194849 A1* | 7/2015 | Kayano | H02K 1/276 | 310/156.53 |
| 2015/0256038 A1* | 9/2015 | Nigo | F25B 31/026 | 310/156.57 |
| 2015/0372578 A1* | 12/2015 | Matsuda | H02K 1/276 | 310/156.07 |
| 2015/0380996 A1* | 12/2015 | Kim | H02K 1/2773 | 310/156.56 |
| 2016/0365762 A1* | 12/2016 | Liang | H02K 1/2706 | |
| 2017/0085143 A1* | 3/2017 | Tanaka | H02K 29/03 | |
| 2017/0104376 A1* | 4/2017 | Nakagawa | H02K 1/2773 | |
| 2017/0279322 A1* | 9/2017 | Sasaki | G01N 27/82 | |
| 2018/0309333 A1* | 10/2018 | Makino | H02K 1/27 | |
| 2019/0027981 A1* | 1/2019 | Hong | H02K 1/02 | |
| 2019/0089214 A1* | 3/2019 | Tang | H02K 1/2766 | |
| 2021/0184520 A1* | 6/2021 | Zhang | H02K 1/24 | |

* cited by examiner

HIGH-FREQUENCY ROTATING STRUCTURE WITH PERMANENT MAGNET ROTOR HAVING GROOVES AND MAGNETIC BARRIER SPACES

BACKGROUND OF THE INVENTION

Field of Invention

The invention is related to motors, and more particularly to a high-frequency rotating structure.

Related Art

In order to meet the high-precision requirements of precision machinery for machining accuracy, various technical improvements have been disclosed in the prior art for improving the rotating motor as a power source. Among the technical improvements, the rotation output of a rotor without a perfect roundness is made close to the sine wave, such as a rotor with an outer contour of the radial cross-section being roughly in a quincuncial shape, because cutting lines caused by stalling of rotation of the machine tool machining on the machined object can be avoided, a rotor with a shape closer to a perfect circle is more suitable to be used as the rotating component of a spindle motor.

Certainly, a rotor with a quincuncial radial cross-section can reduce stalling during rotation, but due to its uneven distribution of weight, it is very easy to form stress concentration under high-frequency rotation, which leads to deformation of the silicon steel plates used to form the rotor and shortening of the service life of the motor.

SUMMARY OF THE INVENTION

Therefore, a main object of the invention is to provide a high-frequency rotating structure capable of reducing stress concentration of a rotor without a perfect roundness under high-frequency rotation, reducing component deformation, and prolonging a service life of a motor.

In order to achieve the above-mentioned object, a high-frequency rotating structure provided by the invention has an annular rotating element with a quincuncial outer periphery, a plurality of radially arranged accommodating grooves respectively disposed in an annular body of the rotating element, a plurality of hole-shaped magnetic barrier spaces respectively disposed in the annular body, and respectively communicated with one of two ends of each of the accommodating grooves, and a plurality of magnetic assemblies respectively embedded in each of the accommodating grooves, characterized in that, a shortest first distance A between a groove wall of each of the two ends of each of the accommodating grooves and an outer annular surface of the body, and a shortest second distance B between a hole wall of each of the magnetic barrier spaces and the outer annular surface of the body are defined by the following formula 1:

$$\alpha = \frac{A}{B} \times 100\%, 122\% \geq \alpha \geq 90\% \quad \text{formula 1}$$

Wherein, the outer annular surface is composed of a plurality of first arcuate surfaces and a plurality of second arcuate surfaces, and an arch length of each of the first arcuate surfaces is greater than an arch length of each of the second arcuate surfaces.

Wherein, each of the accommodating grooves respectively extends along a circumference of the body.

Wherein, each of the first distances A is respectively between each of the two ends of each of the accommodating grooves and the second arcuate surface, and each of the second distances B is respectively between each of the magnetic barrier spaces and the second arcuate surface.

Further, each of the accommodating grooves further comprises a first groove segment and two second groove segments respectively located on two ends of the first groove segment, the first groove segment and the second groove segments are communicating with one another, and each of the magnetic barrier spaces is communicated with each of the second groove segments.

Wherein, an expansion angle C between the first groove segment and each of the second groove segments, a maximum distance E between the first arcuate surface and a center of curvature of an inner circular surface of the body, and a minimum distance D between the first groove segment and the center of curvature of the inner circular surface of the body are defined by the following formula 2:

$$\beta = -10 \times \log\left\{\frac{1}{\left[\left(1 - \frac{E-D}{E}\right) \times C\right]^2}\right\}, \beta \geq 42.3 \quad \text{formula 2}$$

DETAILED DESCRIPTION OF THE INVENTION

Figure 1:
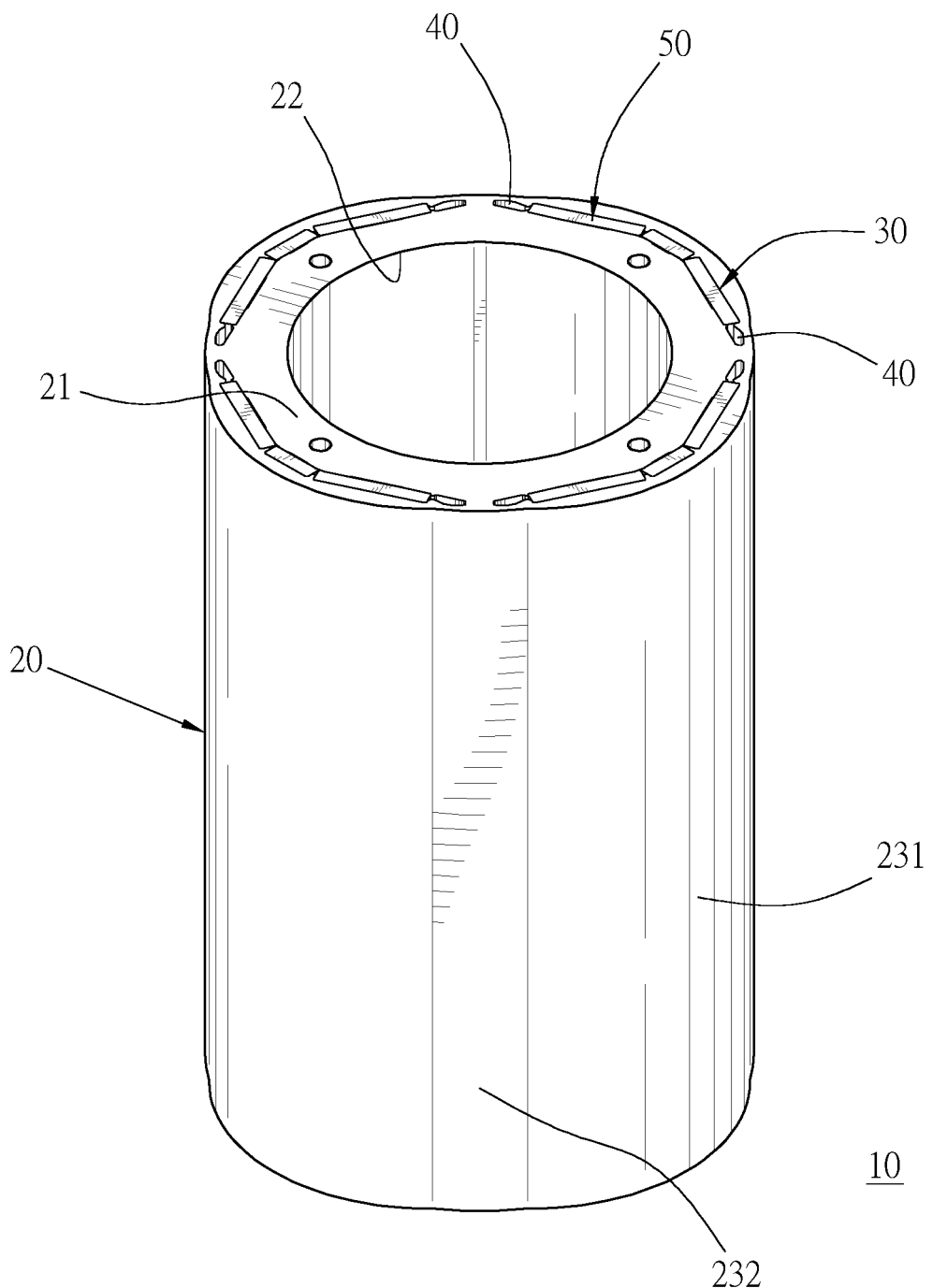
FIG. 1 is a perspective view of a preferred embodiment of the invention.
Figure 2:
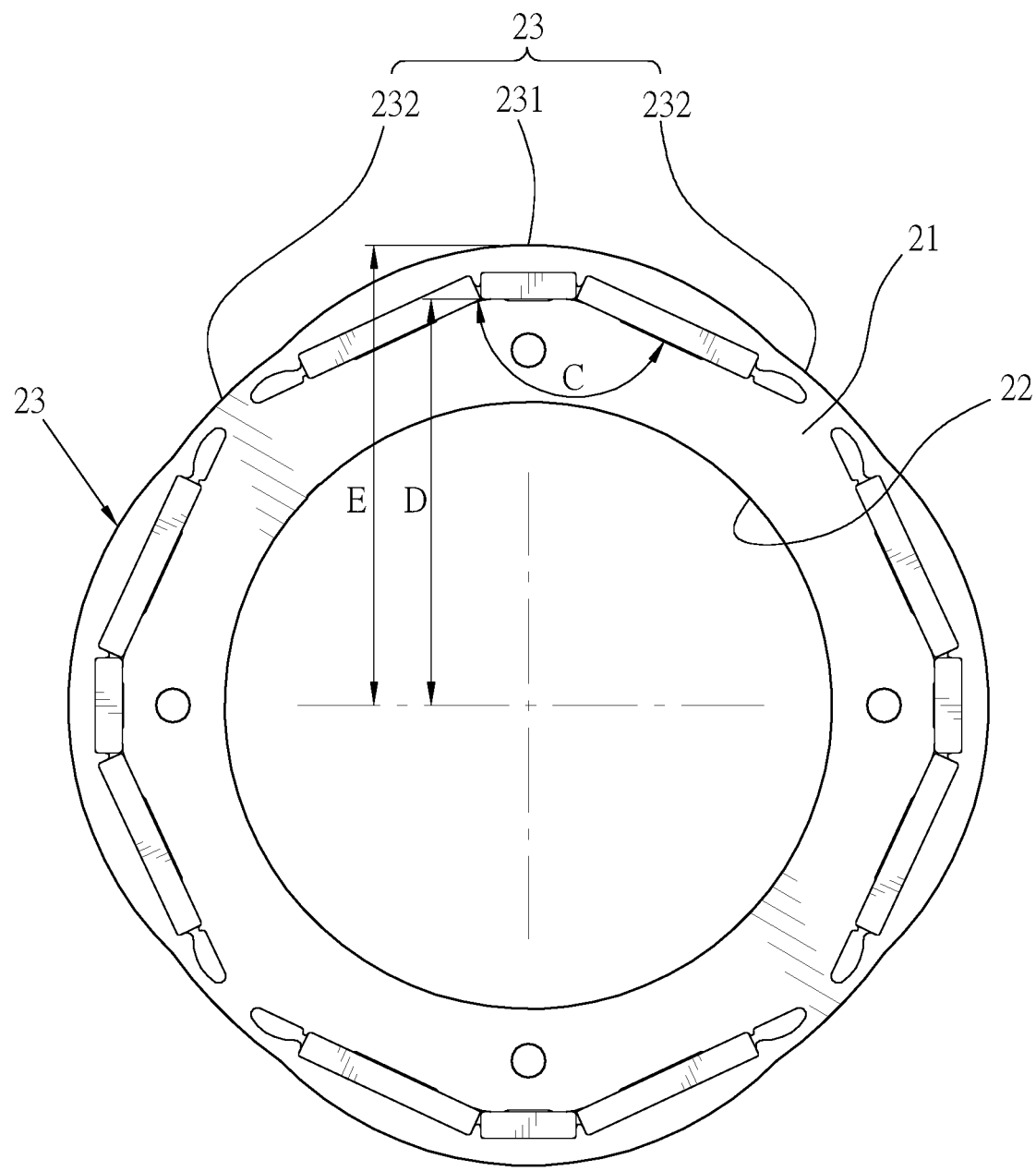
FIG. 2 is a top view of a preferred embodiment of the invention.

First of all, please refer to FIGS. 1 to 4. A high-frequency rotating structure 10 provided in a preferred embodiment of the invention mainly comprises a rotating element 20, a plurality of accommodating grooves 30, a plurality of magnetic barrier spaces 40, and a plurality of magnetic assemblies 50.

Figure 3:
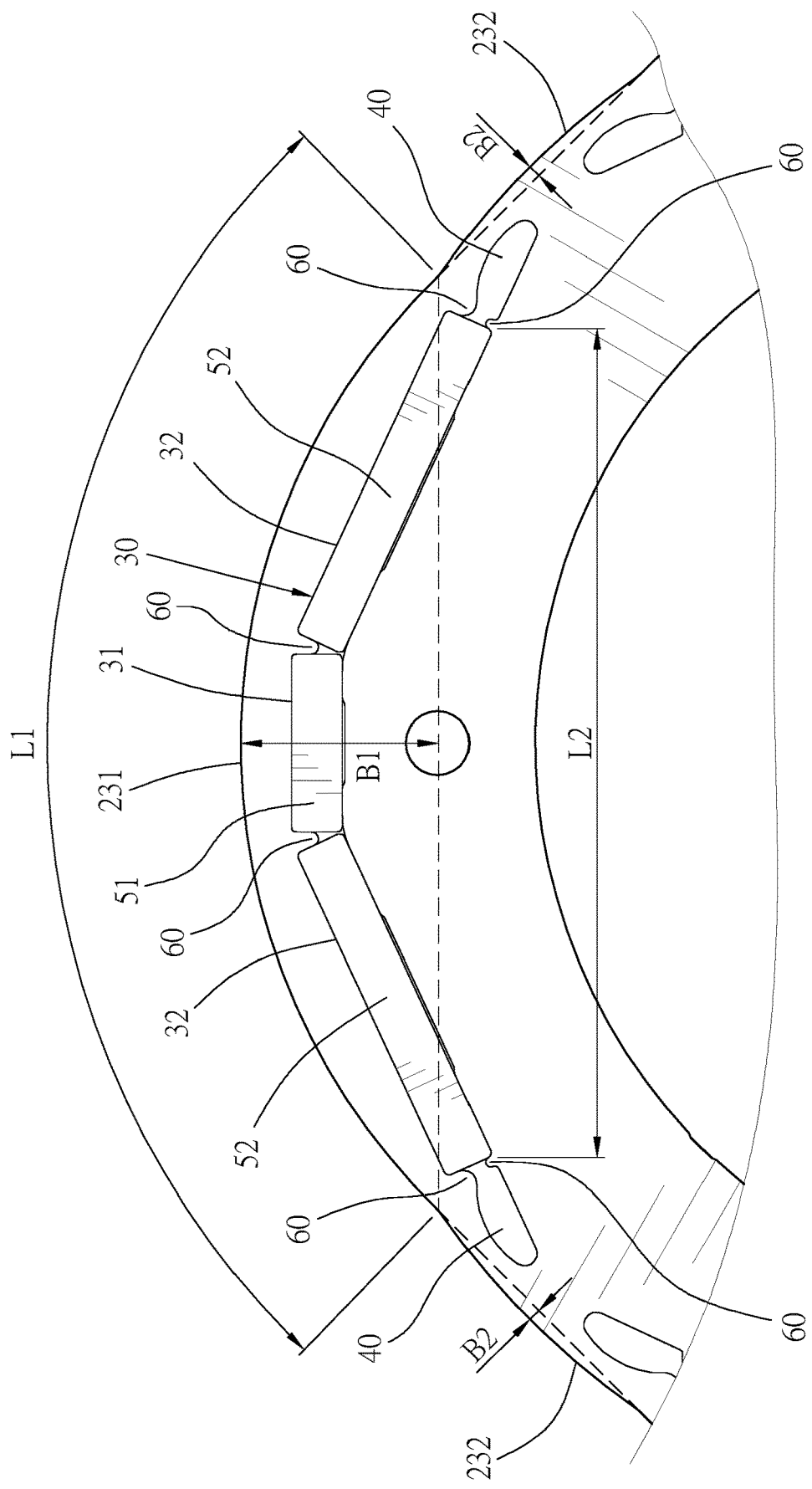
FIG. 3 is a partial enlarged view of a preferred embodiment of the invention in the top view direction.

The rotating element 20 is used as a rotor component of a rotating motor, the rotating element 20 structurally comprises an annular body 21 formed by stacking a plurality of silicon steel plates, an inner circular surface 22 located on an inner peripheral side of the body 21, the inner circular surface 22 being a perfect circle with a center along an axial direction of an annular axis of the body 21, and an outer annular surface 23 located on an outer peripheral side of the body 21, the roughly quincuncial shaped outer annular surface 23 being a non-perfect circle with a center along an axial direction of an annular axis of the body 21. Wherein the outer annular surface 23 without a perfect roundness is formed by a plurality of first arcuate surfaces 231 and a plurality of second arcuate surfaces 232 connecting in sequence, and as shown in FIG. 3, an arch length B1 of the first arcuate surface 231 is greater than an arch length B2 of the second arcuate surface 232, so that a shape of the outer annular surface 23 formed by connection of the first arcuate surfaces 231 and the second arcuate surfaces 232 is close to a contour of a quincuncial shape; wherein, although the circular shape of the inner circular surface 22 is formed by the continuous arcuate surfaces in this embodiment, in actual use, due to disposition of conventional combination structures such as keyway, the circular shape of the inner circular surface 22 is formed by the arcuate surfaces separated by the keyways.

The accommodating grooves 30 are sequentially arranged on the body 21 along a circumferential direction of the body 21 and are spaced apart from one another, and extend axially along a center of curvature of the body 21 to an appropriate depth, and extend along the circumferential direction of the body 21 to a width L2 at least greater than half of an arc length L1 of the first arcuate surface 231, wherein an extension depth of the accommodating grooves 30 can reach an extent of penetrating the body 21 thoroughly, or an extent of not penetrating the body 21 thoroughly, and in this embodiment, the accommodating grooves 30 are made to be not penetrating the body 21 thoroughly.

Further, positions of the accommodating grooves 30 are respectively located on corresponding parts of the body 21 corresponding to the first arcuate surfaces 231, and each of the accommodating grooves 30 comprises a first groove segment 31, and two second groove segments 32 respectively located on two ends of the first groove segment 31, wherein one end of each of the second groove segments 32 is communicated with one of the two ends of the first groove segment 31, and another end of each of the second groove segments 32 is close to a part of the body 21 corresponding to each of the second arcuate surfaces 232.

The hole-shaped magnetic barrier spaces 40 are respectively disposed in the body 21, and are respectively communicated with the other end of each of the second groove segments 32 away from the first groove segment 31, and respectively extend to a part of the body 21 corresponding to each of the second arcuate surfaces 232.

The magnetic assemblies 50 are respectively accommodated and fixed in each of the accommodating grooves 30, and each of the magnetic assemblies 50 corresponds to a pole of the rotating motor, specifically, in this embodiment, a quantity of the magnetic assemblies 50 is four, which corresponds to four poles of the rotating motor. Further, each of the magnetic assemblies 50 further comprises a first magnet 51 and two second magnets 52, the first magnet 51 is embedded in the first groove segment 31, and each of the second magnets 52 is embedded in each of the second groove segments 32 of the same accommodating groove 30.

In order to enable each of the first magnets 51 and each of the second magnets 52 respectively embedded in the accommodating grooves 30 to obtain a better limiting and positioning effect, as shown in FIG. 3, the high-frequency rotating structure 10 further comprises a plurality of limiting protrusions 60, the limiting protrusions 60 are respectively located between the two ends of each of the first groove segments 31 and each of the adjacent second groove segments 32, and between each of the second groove segments 32 and each of the adjacent communicated magnetic barrier spaces 40.

Figure 4:
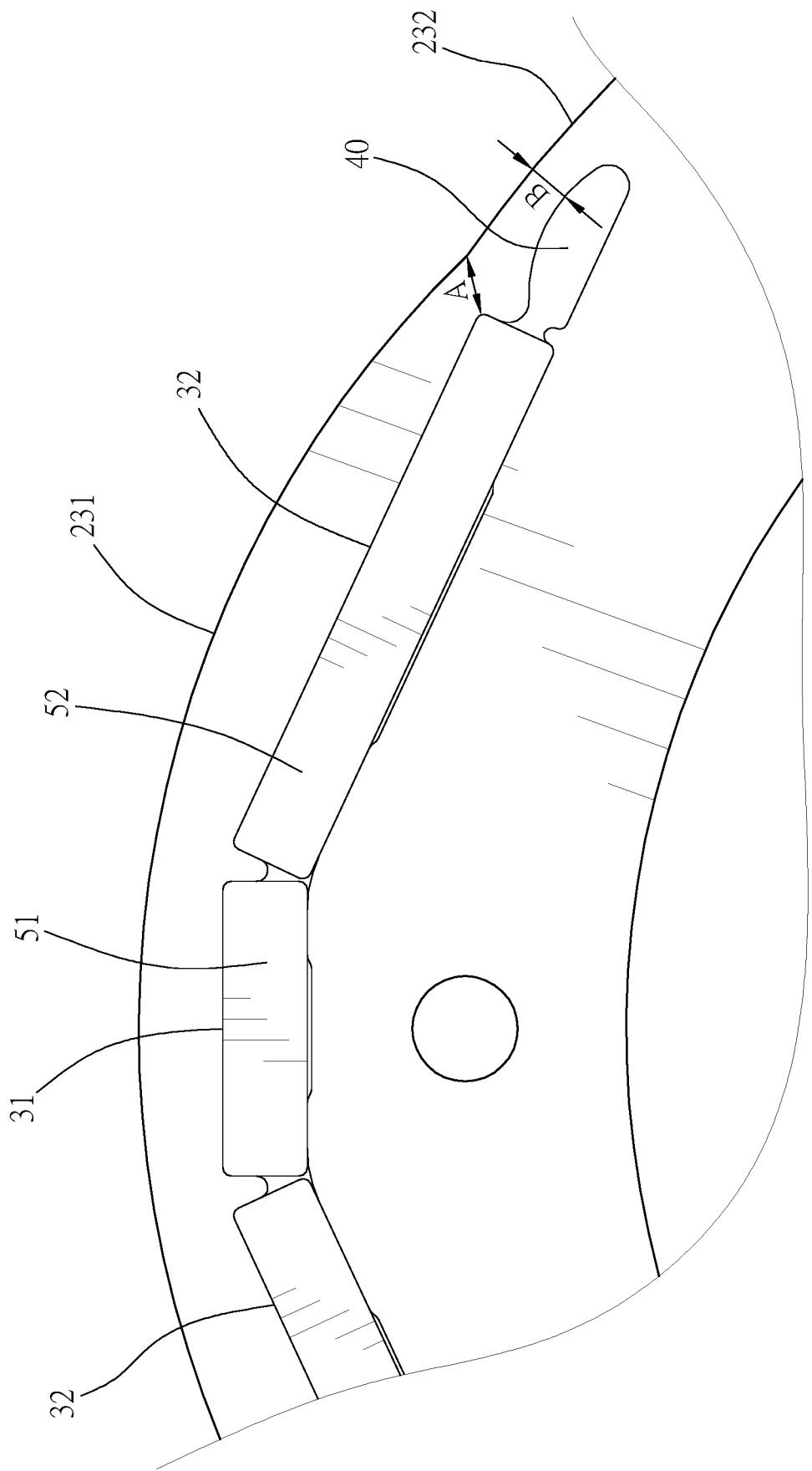
FIG. 4 is another partial enlarged view of a preferred embodiment of the invention in the top view direction.

As shown in FIG. 4, on the basis of the above-mentioned technology, in this embodiment, relative positions between each of the accommodating grooves 30, each of the magnetic barrier spaces 40 and the rotating element 20 are further limited to meet a definition of the following formula 1:

$$\alpha = \frac{A}{B} \times 100\%, 122\% \geq \alpha \geq 90\% \qquad \text{formula 1}$$

Wherein, A in formula 1 is a shortest first distance A between a groove wall of each of the accommodating grooves 30 located at the two ends in a width direction and the outer annular surface 23; and B in formula 1 is a shortest second distance B between a hole wall of each of the magnetic barrier spaces 40 and the outer annular surface 23.

Wherein, the first distance A and the second distance B are linear distances, and end points corresponding to the outer annular surface 23 are located at the corresponding second arcuate surface 232 of the outer annular surface 23.

Please refer to FIG. 2 again. Further, in addition to the relative positions between each of the accommodating grooves 30 and the rotating element 20 meeting the formula 1 shown above, but can also be further limited to meet a definition of the following formula 2:

$$\beta = -10 \times \log\left\{\frac{1}{\left[\left(1 - \frac{E-D}{E}\right) \times C\right]^2}\right\}, \beta \geq 42.3 \qquad \text{formula 2}$$

Wherein, C in formula 2 is an expansion angle C between the first groove segment 31 and the adjacent second groove segment 32 in the single accommodating groove 30;

E in formula 2 is a maximum distance E between the first arcuate surface 231 and a center of curvature of the inner circular surface 22; and D in formula 2 is a minimum distance D between the first groove segment 31 and a center of curvature of the inner circular surface 22.

With composition of the above-mentioned components, the high-frequency rotating structure 10 used as the rotating motor of a rotor component is capable of avoiding the drawbacks of stress concentration caused by the conventional technology, and therefore capable of preventing deformation of the silicon steel plates, and at the same time further increasing an intensity of the magnetic field.

As shown in a table below, an upper limit of stress depends on a material of the silicon steel plates or a magneto-conductive material. Under the conditions that the α value being 122%, 117%, 116%, 110%, 103%, 98.5% and 95.6%, the β value being 42.7, 42.6, 42.5 and 42.3, a stress of a part of the body 21 corresponding to each of the first distances A and each of the second distances B is less than 300 Mpa, and stress concentration can indeed be effectively reduced, thereby prolonging a service life of the high-frequency rotating structure 10 being used as the rotating motor of the rotor component. Wherein, regarding an assembly method of the first magnet 51 and the second magnets 52, different examples of assembly methods are shown in table 1. Combination 1 in the following table means that the first magnet 51 and the second magnets 52 in each of the magnetic assemblies 50 are respectively combined with the limiting protrusions 60 in an impenetrable contact method and capable of separating from the limiting protrusions 60; the first magnet 51 and the first groove segment 31, and the second magnets 52 and the second groove segments 32 adopt an inseparable combination. Combination 2 in the following table means that the first magnet 51 and the second magnets 52 in each of the magnetic assemblies 50, and the limiting protrusions 60, the first groove segment 31 and the second groove segments 32 are inseparably combined.

TABLE 1

|  | Examples | | | | | | |
| --- | --- | --- | --- | --- | --- | --- | --- |
|  | A | B | C | D | E | F | G |
| D (mm) | 30 | 30 | 30 | 29.5 | 29.5 | 29.5 | 29 |
| Bridge center distance (mm) | 30.5 | 31 | 30 | 29.5 | 31 | 31 | 31 |
| A (mm) | 1.74 | 1.03 | 1.97 | 2.39 | 1.22 | 1.1 | 1.17 |
| B (mm) | 1.5 | 1 | 2 | 2.5 | 1 | 1 | 1 |
| C (angular degree) | 152 | 155 | 151 | 151 | 156 | 156.5 | 158 |
| Combination 1 | | | | | | | |
| Position of stress corresponding to the second distance (MPa) | 260 | 249 | 206 | 202 | 296 | 268 | 286 |
| Position of stress corresponding to the first distance (MPa) | 298 | 209 | 297 | 286 | 228 | 262 | 218 |
| Combination 2 | | | | | | | |
| Position of stress corresponding to the second distance (MPa) | 284 | 260 | 238 | 232 | 297 | 269 | 280 |
| Position of stress corresponding to the first distance (MPa) | 223 | 216 | 240 | 224 | 297 | 269 | 280 |
| α value | 116 | 103 | 98.5 | 95.6 | 122 | 110 | 117 |
| β value | 42.5 | 42.7 | 42.5 | 42.3 | 42.6 | 42.7 | 42.6 |

Figure 5:
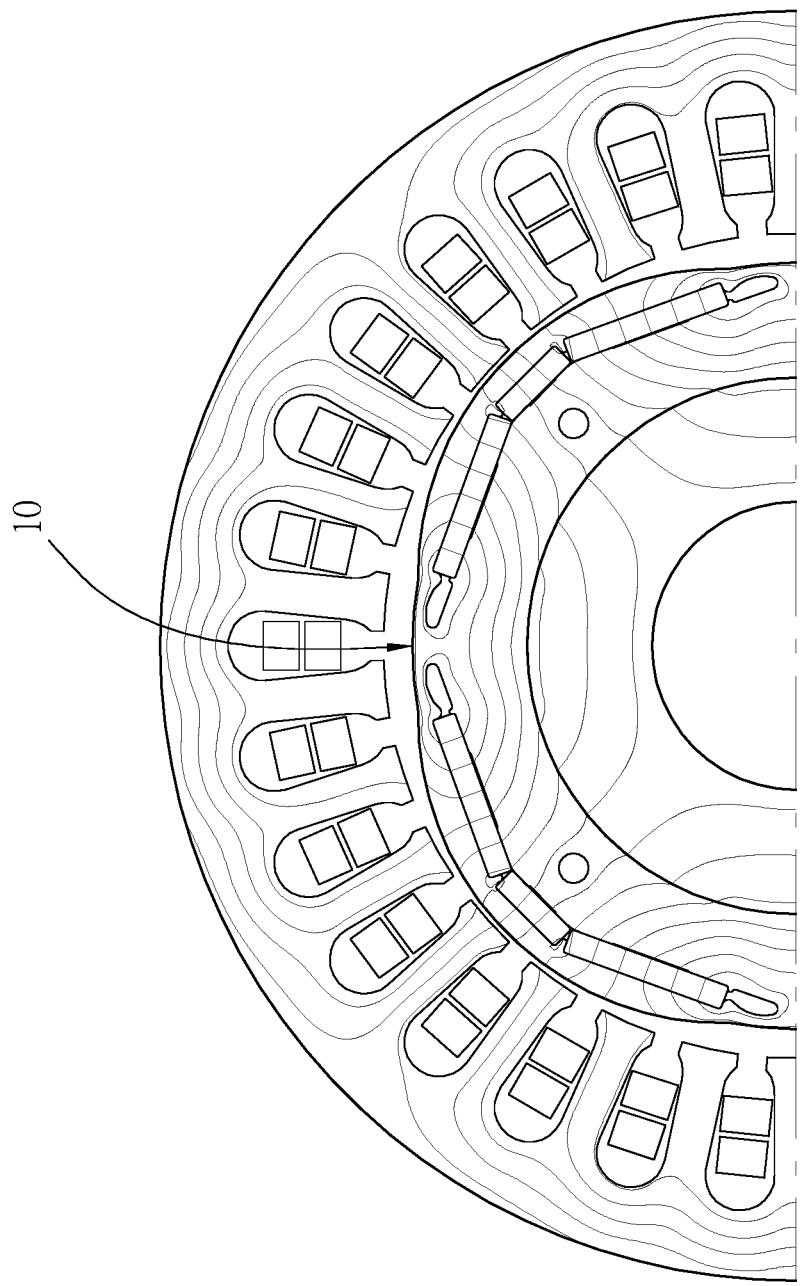
FIG. 5 is a diagram of magnetic lines of force of an example of the invention.

Furthermore, please refer to FIG. 5 for a diagram of magnetic lines of force of the invention, which shows magnetic lines of force of the example B in the above table, and proves that the invention has good magnetic properties.

It is to be understood that the above description is only the embodiments and examples of the invention and is not used to limit the present invention, and changes in accordance with the concepts of the present invention may be made without departing from the spirit of the present invention. For example, the equivalent effects produced by various transformations, variations, modifications and applications made to the configurations or arrangements shall still fall within the scope covered by the appended claims of the present invention.

What is claimed is:

1. A high-frequency rotating structure comprising:
a rotating element having an annular body, an inner circular surface in a circle shape disposed along an axial direction of an annular axis of the body and located on an inner peripheral side of the body, and an outer annular surface without a perfect roundness disposed along an axial direction of an annular axis of the body and located on an outer peripheral side of the body, the outer annular surface being formed by connecting a plurality of first arcuate surfaces with a plurality of second arcuate surfaces;
a plurality of accommodating grooves sequentially arranged on the body along a circumferential direction of the body and spaced apart from one another, and extending axially along a center of curvature of the body to a predetermined depth, and extending along the circumferential direction of the body to a predetermined width at least greater than half of an arc length of the first arcuate surface;
a plurality of magnetic assemblies respectively accommodated in each of the accommodating grooves; and
a plurality of hole-shaped magnetic barrier spaces respectively disposed in the body, and respectively communicated with one of two ends in a width direction of each of the accommodating grooves;
characterized in that:
a shortest first distance A between a groove wall of each of the two ends in a width direction of each of the accommodating grooves and the outer annular surface, and a shortest second distance B between a hole wall of each of the magnetic barrier spaces and the outer annular surface are defined by the following formula 1:

$$\alpha = \frac{A}{B} \times 100\%, \ 122\% \geq \alpha \geq 90\%; \quad \text{formula 1}$$

wherein each of the accommodating grooves is respectively located on a part of the body corresponding to each of the first arcuate surfaces, and each of the accommodating grooves further comprises a first groove segment, and two second groove segments respectively connecting with two ends of the first groove segment, and each of the magnetic barrier spaces is communicated with each of the second groove segments;
wherein an expansion angle C between the first groove segment and each of the second groove segments, a maximum distance E between the first arcuate surface and a center of curvature of the inner circular surface of the body, and a minimum distance D between the first groove segment and the center of curvature of the inner circular surface of the body are defined by the following formula 2:

$$\beta = -10 \times \log\left\{\frac{1}{\left[\left(1-\frac{E-D}{E}\right) \times C\right]^2}\right\}, \ \beta \geq 42.3. \quad \text{formula 2}$$

2. The high-frequency rotating structure as claimed in claim 1, wherein each of the first distances A is respectively between the second groove segment and the adjacent second arcuate surface, and each of the second distances B is respectively between the magnetic barrier space and the adjacent second arcuate surface.

3. The high-frequency rotating structure as claimed in claim 1, wherein α is 122%, 117%, 116%, 110%, 103%, 98.5% or 95.6%.

4. The high-frequency rotating structure as claimed in claim 1, wherein β is 42.7, 42.6, 42.5 or 42.3.

5. The high-frequency rotating structure as claimed in claim 1, wherein an arch length of each of the first arcuate surfaces is greater than an arch length of each of the second arcuate surfaces.

6. The high-frequency rotating structure as claimed in claim 5, wherein each of the first distances A is respectively between the second groove segment and the adjacent second arcuate surface, and each of the second distances B is respectively between the magnetic barrier space and the adjacent second arcuate surface.

7. A high-frequency rotating structure comprising:
a rotating element having an annular body, an inner circular surface in a circle shape disposed along an axial direction of an annular axis of the body and located on an inner peripheral side of the body, and an outer annular surface without a perfect roundness disposed along an axial direction of an annular axis of the body and located on an outer peripheral side of the body, the outer annular surface being formed by connecting a plurality of first arcuate surfaces with a plurality of second arcuate surfaces;
a plurality of accommodating grooves sequentially arranged on the body along a circumferential direction of the body and spaced apart from one another, and extending axially along a center of curvature of the body to a predetermined depth, and extending along the circumferential direction of the body to a predetermined width at least greater than half of an arc length of the first arcuate surface;
a plurality of magnetic assemblies respectively accommodated in each of the accommodating grooves; and
a plurality of hole-shaped magnetic barrier spaces respectively disposed in the body, and respectively communicated with one of two ends in a width direction of each of the accommodating grooves;
characterized in that:
a shortest first distance A between a groove wall of each of the two ends in a width direction of each of the accommodating grooves and the outer annular surface, and a shortest second distance B between a hole wall of each of the magnetic barrier spaces and the outer annular surface are defined by the following formula 1:

$$\alpha = \frac{A}{B} \times 100\%, 122\% \geq \alpha \geq 90\%;\qquad \text{formula 1}$$

wherein each of the accommodating grooves is respectively located on a part of the body corresponding to each of the first arcuate surfaces, and each of the accommodating grooves further comprises a first groove segment, and two second groove segments respectively connecting with two ends of the first groove segment, and each of the magnetic barrier spaces is communicated with each of the second groove segments;
wherein an arch length of each of the first arcuate surfaces is greater than an arch length of each of the second arcuate surfaces;
wherein an expansion angle C between the first groove segment and each of the second groove segments, a maximum distance E between the first arcuate surface and a center of curvature of the inner circular surface of the body, and a minimum distance D between the first groove segment and the center of curvature of the inner circular surface of the body are defined by the following formula 2:

$$\beta = -10 \times \log\left\{\frac{1}{\left[\left(1 - \frac{E-D}{E}\right) \times C\right]^2}\right\}, \beta \geq 42.3.\qquad \text{formula 2}$$

8. The high-frequency rotating structure as claimed in claim 7, wherein $\beta$ is 42.7, 42.6, 42.5 or 42.3.

9. The high-frequency rotating structure as claimed in claim 7, wherein each of the first distances A is respectively between the second groove segment and the adjacent second arcuate surface, and each of the second distances B is respectively between the magnetic barrier space and the adjacent second arcuate surface.

10. The high-frequency rotating structure as claimed in claim 7, wherein $\alpha$ is 122%, 117%, 116%, 110%, 103%, 98.5% or 95.6%.

* * * * *